US012365010B2

(12) United States Patent
Yeh et al.

(10) Patent No.: US 12,365,010 B2
(45) Date of Patent: Jul. 22, 2025

(54) WIPING APPARATUS

(71) Applicant: Wistron Corporation, New Taipei (TW)

(72) Inventors: Shun-Chi Yeh, New Taipei (TW); Fu-Hua Yan, New Taipei (TW); Ze-Shan Yan, New Taipei (TW); Yu-Long Mo, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 495 days.

(21) Appl. No.: 17/859,418

(22) Filed: Jul. 7, 2022

(65) Prior Publication Data

US 2023/0338992 A1 Oct. 26, 2023

(30) Foreign Application Priority Data

Apr. 25, 2022 (CN) ......................... 202210439427.6

(51) Int. Cl.
*B08B 1/20* (2024.01)
*B08B 1/14* (2024.01)

(52) U.S. Cl.
CPC ................ *B08B 1/20* (2024.01); *B08B 1/143* (2024.01)

(58) Field of Classification Search
CPC ......... B08B 7/0028; B08B 15/04; B08B 1/50; B08B 1/32; B08B 1/04; B08B 1/143; B08B 1/2015; B08B 1/97; H04M 1/24; B65G 47/91; B32K 29/362
See application file for complete search history.

(56) References Cited

FOREIGN PATENT DOCUMENTS

| | | | | | |
|---|---|---|---|---|---|
| CN | 111250449 A | | 6/2020 | | |
| CN | 111285054 A | | 6/2020 | | |
| CN | 210899269 U | | 6/2020 | | |
| CN | 213645051 U | * | 7/2021 | ............... | B08B 1/30 |

* cited by examiner

*Primary Examiner* — Katina N. Henson
(74) *Attorney, Agent, or Firm* — McClure, Qualey & Rodack, LLP

(57) ABSTRACT

A wiping apparatus includes a wiping mechanism, a sensor set, and a conveying mechanism. The sensor set includes a first station sensor, the first station sensor corresponds to the wiping mechanism, and the first station sensor is configured to generate a first station signal. The conveying mechanism corresponds to the wiping mechanism, the conveying mechanism is configured to generate a first conveying movement, and the first conveying movement responds to the first station signal. The wiping mechanism generates a first wiping motion according to the first station signal and a first wiping parameter, and the wiping mechanism generates a second wiping motion according to the first wiping motion and a second wiping parameter.

19 Claims, 11 Drawing Sheets

WIPING APPARATUS

CROSS-REFERENCE TO RELATED APPLICATION

This non-provisional application claims priority under 35 U.S.C. § 119(a) to Patent Application No. 202210439427.6 filed in China on Apr. 25, 2022, the entire contents of which are hereby incorporated by reference.

BACKGROUND

Technical Field

The present disclosure relates to a wiping apparatus, and specifically, to a wiping apparatus capable of generating at least two wiping motions.

Related Art

With the advent of Industry 4.0, process automation has become a current trend; especially manufacturing production lines of electronic devices have achieved a high degree of automation, which can save a lot of human resources. A further wiping operation needs to be performed on all electronic products before leaving factories. Currently, a wiping operation is manually performed on all electronic products (for example, notebook computers). During the wiping operation, a production line worker opens the notebook computer, and then manually wipe various parts of the notebook computer with alcohol, to achieve a cleaning requirement of wiping this product. The wiping operation manually performed requires a lot of human resources, and it is also difficult for different production line workers to achieve a consistent degree of cleaning. In addition, the wiping operation manually performed also consumes a lot of operation time.

SUMMARY

In in view of this, a wiping apparatus is provided herein. According to some embodiments, the wiping apparatus includes a wiping mechanism, a sensor set, and a conveying mechanism. The sensor set includes a first station sensor. The first station sensor corresponds to the wiping mechanism. The first station sensor is configured to generate a first station signal. The conveying mechanism corresponds to the wiping mechanism, the conveying mechanism is configured to generate a first conveying movement, and the first conveying movement responds to the first station signal. The wiping mechanism generates a first wiping motion according to the first station signal and a first wiping parameter. The wiping mechanism generates a second wiping motion according to the first wiping motion and a second wiping parameter.

According to some embodiments, the first station sensor includes a first start sensor and a first end sensor, the first station signal includes a first start signal and a first end signal, the first start sensor corresponds to one side of the wiping mechanism, the first start sensor is configured to generate the first start signal, the first end sensor corresponds to the other side of the wiping mechanism, and the first end sensor is configured to generate the first end signal. The conveying mechanism includes a first conveying sub-mechanism, and two sides of the first conveying sub-mechanism correspond to the first start sensor and the first end sensor respectively, the first conveying sub-mechanism is configured to generate the first conveying movement, and the first conveying movement responds to the first start signal. The wiping mechanism includes a first wiping sub-mechanism, two sides of the first wiping sub-mechanism correspond to the first start sensor and the first end sensor respectively, and the first wiping sub-mechanism is configured to generate the first wiping motion and the second wiping motion.

According to some embodiments, the wiping apparatus further includes a code scanning apparatus and a control apparatus. The code scanning apparatus obtains an identification code according to a code scanning signal, and the control apparatus obtains the first wiping parameter and the second wiping parameter according to the identification code.

According to some embodiments, the wiping mechanism further includes a second wiping sub-mechanism and a third wiping sub-mechanism, one side of the second wiping sub-mechanism corresponds to the first wiping sub-mechanism, and the third wiping sub-mechanism corresponds to the other side of the second wiping sub-mechanism. The sensor set further includes a second station sensor and a third station sensor. The second station sensor and the third station sensor correspond to the second wiping sub-mechanism and the third wiping sub-mechanism respectively. The second station sensor is configured to generate a second station signal. The third station sensor is configured to generate a third station signal. The conveying mechanism is configured to generate a second conveying movement and a third conveying movement, the second conveying movement responds to the second station signal, and the third conveying movement responds to the third station signal. The second wiping sub-mechanism generates a third wiping motion according to the second station signal and a third wiping parameter, the third wiping sub-mechanism generates a fourth wiping motion according to the third station signal and a fourth wiping parameter, and the control apparatus obtains the third wiping parameter and the fourth wiping parameter according to the identification code.

According to some embodiments, the second station sensor further includes a second start sensor and a second end sensor. The second start sensor and the second end sensor are located on two side of the second wiping sub-mechanism respectively. The second station signal includes a second start signal and a second end signal. The second start sensor is configured to generate a second start signal. The second end sensor is configured to generate a second end signal. The third station sensor further includes a third start sensor and a third end sensor. The third start sensor and the third end sensor are located on two sides of the third wiping sub-mechanism respectively. The third station signal includes a third start signal and a third end signal. The third start sensor is configured to generate a third start signal. The third end sensor is configured to generate a third end signal. The second conveying movement responds to the second start signal and the second end signal. The third conveying movement responds to the third start signal and the third end signal. The third wiping motion responds to the second start signal and the second end signal. The fourth wiping motion responds to the third start signal and the third end signal.

In summary, when a to-be-wiped item is wiped by using a wiping apparatus, the wiping apparatus may perform a combination of more than two wiping modes of a first wiping motion, a second wiping motion, a third wiping motion, and a fourth wiping motion, so that wiping of different parts of the to-be-wiped item can be completed during conveying of the wiping apparatus.

The embodiments are described in detail below. However, the embodiments are merely used as examples for description and do not limit or reduce the protection scope of the present invention. In addition, some elements are omitted in the drawings in the embodiments to clearly show the technical features of the present invention. The same reference numeral is used for indicating the same or similar elements in all of the drawings.

DETAILED DESCRIPTION

Figure 1:
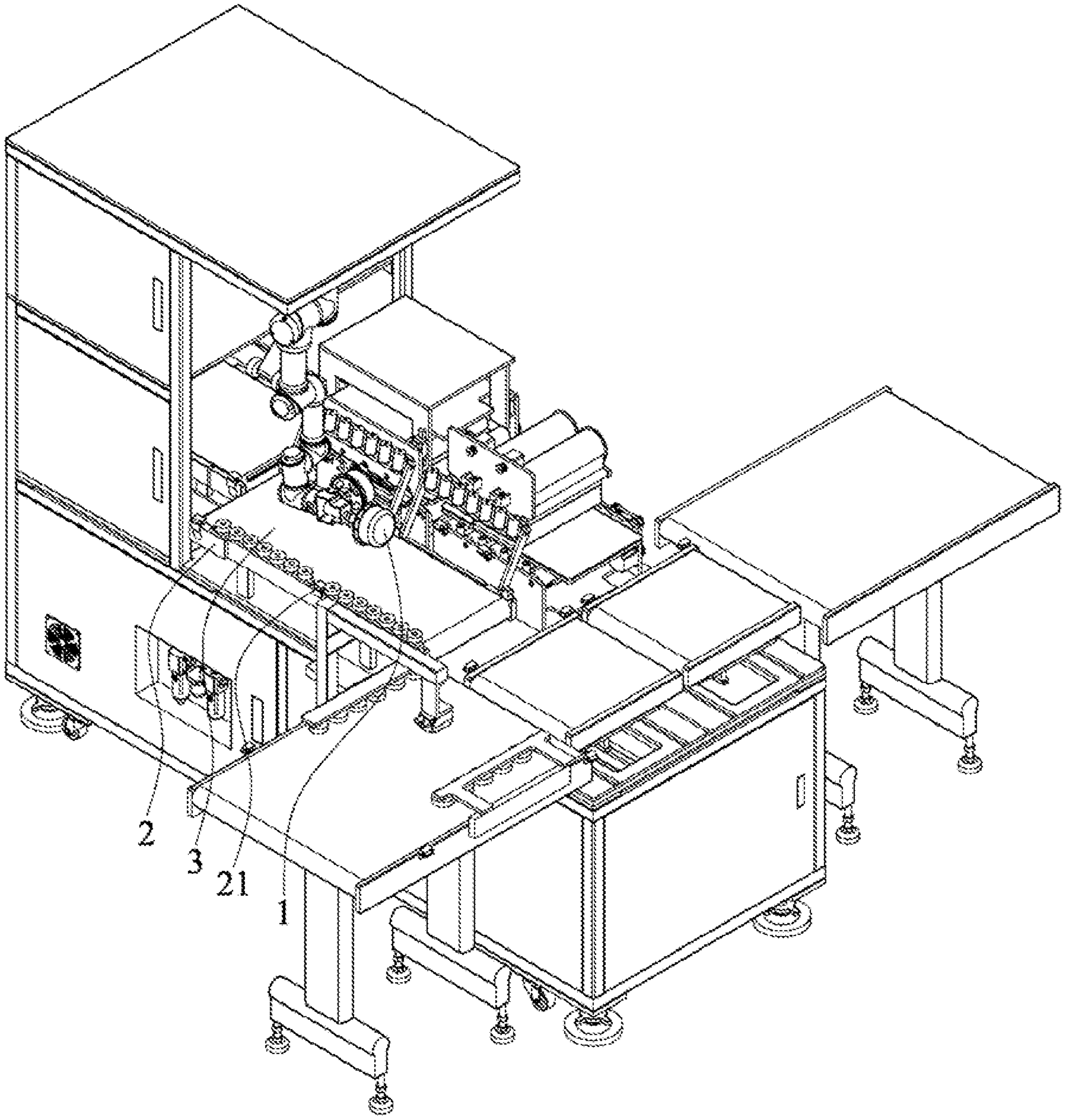
FIG. 1 is a three-dimensional diagram of a wiping apparatus in some embodiments of the present invention.

FIG. 1 is a three-dimensional diagram of a wiping apparatus in some embodiments of the present invention. As shown in FIG. 1, according to some embodiments, the wiping apparatus includes a wiping mechanism 1, a sensor set 2, and a conveying mechanism 3. The sensor set 2 includes a first station sensor 21. The first station sensor 21 corresponds to the wiping mechanism 1, which may mean that the first station sensor 21 is located in the conveying mechanism 3 and corresponds to the wiping mechanism 1. The first station sensor 21 is configured to generate a first station signal, which may mean that the first station sensor 21 is triggered to generate a first station signal. The conveying mechanism 3 corresponds to the wiping mechanism 1, the conveying mechanism 3 is configured to generate a first conveying movement, and the first conveying movement responds to the first station signal, which may mean that the conveying mechanism 3 stops the first conveying movement according to the first station signal. The wiping mechanism 1 generates a first wiping motion according to the first station signal and a first wiping parameter. The wiping mechanism 1 generates a second wiping motion according to the first wiping motion and a second wiping parameter. In some embodiments, the wiping mechanism 1 may store the first wiping parameter and the second wiping parameter. In some other embodiments, the wiping mechanism 1 may store the first wiping parameter, the second wiping parameter, a third wiping parameter, and a fourth wiping parameter (described later).

The first conveying movement may be a displacement movement or a rotation movement, the displacement movement may be a movement along a predetermined path, and the predetermined path may be a linear path, a curved path, or a reciprocating path. The conveying mechanism 3 may be a carrying platform or a conveying belt, the carrying platform may generate a displacement movement or a rotation movement, and the conveyor belt may generate a displacement movement or a rotation movement. The first wiping motion corresponds to a first wiping range (or a first to-be-wiped surface) of a to-be-wiped item, and the second wiping motion corresponds to a second wiping range (or a second to-be-wiped surface) of the to-be-wiped item. Therefore, when generating the first wiping motion, the wiping mechanism 1 wipes a to-be-wiped item at a first station within the first wiping range. When generating the second wiping motion, the wiping mechanism 1 wipes the to-be-wiped item at the first station within the second wiping range. The to-be-wiped item is, for example, but not limited to, a notebook computer.

Therefore, when the to-be-wiped item is placed on the conveying mechanism 3 and moved to a position corresponding to the first station sensor 21, the first station sensor 21 is triggered to generate a first station signal, the wiping mechanism 1 generates a first wiping motion according to the first station signal and a first wiping parameter, and the first wiping motion may correspond to a first to-be-wiped surface of the to-be-wiped item. Therefore, when generating the first wiping motion, the wiping mechanism 1 wipes the first to-be-wiped surface. In some embodiments, the to-be-wiped item may be moved to the position of the first station sensor 21 by using the conveying mechanism 3 to trigger the first station sensor 21, or the to-be-wiped item may be placed at the position of the first station sensor 21 to trigger the first station sensor 21. The wiping mechanism 1 also generates a second wiping motion according to the first wiping motion and a second wiping parameter, and the second wiping motion corresponds to a second to-be-wiped surface of the to-be-wiped item. Therefore, when generating the second wiping motion, the wiping mechanism 1 wipes the second to-be-wiped surface.

"The wiping mechanism 1 also generates a second wiping motion according to the first wiping motion and a second wiping parameter" described above may mean that when the first wiping motion ends, the wiping mechanism 1 generates the second wiping motion according to the second wiping parameter to wipe the second to-be-wiped surface. "The wiping mechanism 1 also generates a second wiping motion according to the first wiping motion and a second wiping parameter" described above may alternatively mean that when the first wiping motion ends, after the conveying mechanism 3 moves by a predetermined distance, the wiping mechanism 1 generates the second wiping motion according to the second wiping parameter to wipe the second to-be-wiped surface; or after the first wiping motion ends, the wiping mechanism 1 then performs the second wiping motion. In some embodiments, when the wiping mechanism 1 completes the second wiping motion, the conveying mechanism 3 continues the first conveying movement.

Figure 2:
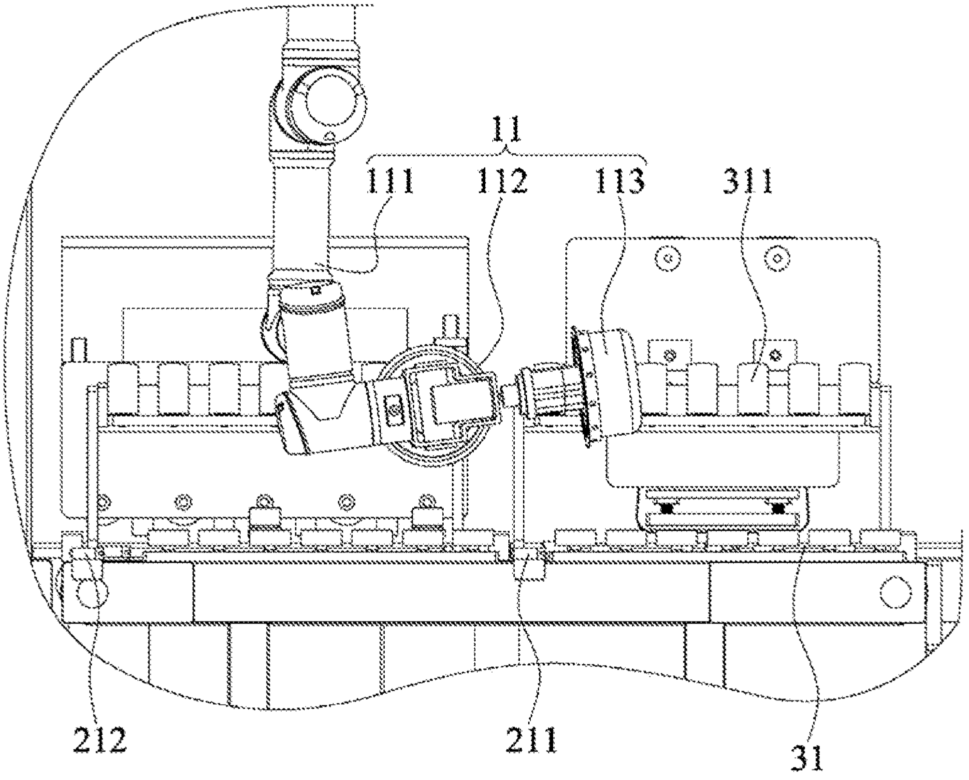
FIG. 2 is a side view of a wiping apparatus at a first station in some embodiments of the present invention.

FIG. 2 is a side view of a wiping apparatus at a first station in some embodiments of the present invention. As shown in FIG. 1 and FIG. 2, according to some embodiments, the first station sensor 21 includes a first start sensor 211 and a first end sensor 212. The first station signal includes a first start signal and a first end signal. The first start sensor 211 corresponds to one side of the wiping mechanism 1. The first start sensor 211 is configured to generate the first start signal, which may mean that the first start sensor 211 is triggered to generate the first start signal. The first end sensor 212 corresponds to the other side of the wiping mechanism 1. The first end sensor 212 is configured to generate the first end signal, which may mean that the first end sensor 212 is triggered to generate the first end signal. The first station signal includes the first start signal and the first end signal, or the first start signal only, or the first end signal only. A setting of the first station signal may have different control modes according to different operating conditions, and the sensor set 2 may be set according to different control modes. For example, when the first station signal includes the first start signal and the first end signal, the first station sensor 21 needs to have a corresponding quantity of the first start sensors 211 and the first end sensors 212, but the present invention is not limited thereto. The first station sensor 21 may be a light sensor, a laser sensor, an image sensor, or an ultrasonic sensor.

As shown in FIG. 2, according to some embodiments, the conveying mechanism 3 includes a first conveying sub-mechanism 31. Two sides of the first conveying sub-mechanism 31 correspond to the first start sensor 211 and the first end sensor 212 respectively. The first conveying sub-mechanism 31 is configured to generate a first conveying movement, and the first conveying movement responds to the first start signal, which may mean that the first conveying sub-mechanism 31 stops the first conveying movement when receiving the first start signal sent by the first start sensor 211. According to some embodiments, the wiping mechanism 1 includes a first wiping sub-mechanism 11. Two sides of the first wiping sub-mechanism 11 correspond to the first start sensor 211 and the first end sensor 212 respectively. The first wiping sub-mechanism 11 is configured to generate a first wiping motion and a second wiping motion, which may mean that the first wiping motion is generated when the first conveying movement stops, and the second wiping motion is generated when the first wiping motion ends. The first wiping sub-mechanism 11 may immediately start the first wiping motion or the second wiping motion, or stop for a predetermined time and then start the first wiping motion or the second wiping motion again. The predetermined time may be set according to a process requirement, and both can be implemented when the first wiping sub-mechanism 11 and the first conveying sub-mechanism 31 do not interfere with each other.

According to some embodiments, the first wiping parameter includes a first wiping range. The first wiping sub-mechanism 11 performs the first wiping motion within the first wiping range. The second wiping parameter includes a second wiping range, and the first wiping sub-mechanism 11 performs the second wiping motion within the second wiping range. The to-be-wiped item is, for example, but not limited to, a notebook computer. The first wiping motion may be wiping a screen of the notebook computer, and the first wiping parameter sets the first wiping range according to a screen size of the notebook computer. The first wiping motion may be wiping a keyboard of the notebook computer, and the first wiping parameter sets the first wiping range according to a keyboard size of the notebook computer. The first wiping motion may be wiping an upper cover of the notebook computer, and the first wiping parameter sets the first wiping range according to an upper cover size of the notebook computer. The first wiping motion may be wiping a baseplate of the notebook computer, and the first wiping parameter sets the first wiping range according to a baseplate size of the notebook computer. The second wiping parameter is also in the same case, and details are not described herein again.

According to some embodiments, the first wiping parameter further includes a first wiping speed and a first wiping path. The first wiping sub-mechanism 11 performs the first wiping motion within the first wiping range according to the first wiping speed and the first wiping path. The second wiping parameter further includes a second wiping speed and a second wiping path, and the first wiping sub-mechanism 11 performs the second wiping motion within the second wiping range according to the second wiping speed and the second wiping path. According to some embodiments, the first wiping path and the second wiping path correspond to the first wiping range and the second wiping range respectively. For example, when the first wiping range is a screen range of the notebook computer, the first wiping path plans a movement path of the first wiping sub-mechanism 11 in the screen range of the notebook computer, so that the first wiping sub-mechanism 11 may correspond to a full range of the screen. When the second wiping range may alternatively be a keyboard range of the notebook computer, the second wiping path plans a movement path of the first wiping sub-mechanism 11 in the keyboard range of the notebook computer, so that the first wiping sub-mechanism 11 may correspond to a full range of the keyboard.

Referring to FIG. 2 again, according to some embodiments, the first wiping sub-mechanism 11 further includes a mechanical arm 111, a first wiping head 112, and a second wiping head 113. The first wiping head 112 and the second wiping head 113 are separately connected to the mechanical arm 111. The mechanical arm 111 separately drives the first wiping head 112 and the second wiping head 113, so that the first wiping head 112 performs the first wiping motion within the first wiping range, and the second wiping head 113 performs the second wiping motion within the second wiping range. The first wiping head 112 and the second wiping head 113 may generate a rotation movement or a reciprocating movement, so that when being in contact with a wiping part, the first wiping head 112 and the second wiping head 113 may perform a wiping motion through the rotation movement or the reciprocating movement. According to some embodiments, the mechanical arm 111 drives, by multi-axial movement, the first wiping head 112 or the second wiping head 113 to move to the first wiping range or the second wiping range respectively.

Figure 3:
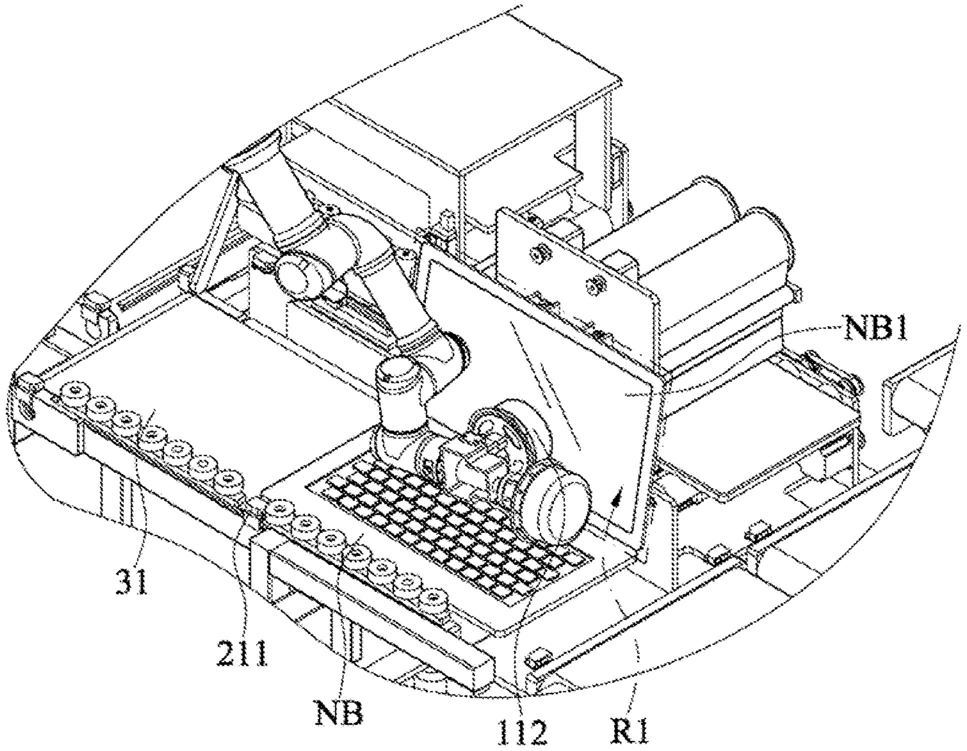
FIG. 3 is a schematic diagram of a first wiping motion in some embodiments of the present invention.

FIG. 3 is a schematic diagram of a first wiping motion in some embodiments of the present invention. As shown in FIG. 1 to FIG. 3, according to some embodiments, a user places a to-be-wiped item NB (for example, but not limited to, a notebook computer) on the first conveying sub-mechanism 31, and the first conveying sub-mechanism 31 performs the first conveying movement to convey the to-be-wiped item NB. The first conveying sub-mechanism 31 may generate the first conveying movement when the wiping apparatus starts, or the first conveying sub-mechanism 31 may be driven by another sensor to generate the first conveying movement (described later by using an example). In a process that the first conveying sub-mechanism 31 performs the first conveying movement, when the first start sensor 211 senses the to-be-wiped item NB, the first start sensor 211 is triggered to generate the first start signal. The first conveying sub-mechanism 31 stops the first conveying movement according to the first start signal, and when the first wiping sub-mechanism 11 stops the first conveying movement, the first wiping sub-mechanism 11 starts the first wiping motion according to the first wiping parameter and the first start signal. According to some embodiments, the to-be-wiped item NB is a notebook computer, a first wiping range R1 is a range of a screen NB1 of the notebook computer, and the first wiping sub-mechanism 11 performs the first wiping motion according to the first wiping range R1 to clean the screen NB1. The first wiping range R1 may be greater than or equal to a size of the screen NB1. When the first wiping sub-mechanism 11 starts to perform the first wiping motion, the first wiping sub-mechanism 11 performs wiping in the first wiping range R1 according to the first wiping speed and the first wiping path by using the first wiping head 112.

For "the first conveying sub-mechanism 31 may generate the first conveying movement when the wiping apparatus starts" described above, in some embodiments, when the user starts the wiping apparatus, the first conveying sub-mechanism 31 may generate the first conveying movement along with the start of the wiping apparatus, and the user may place the to-be-wiped item NB on the first conveying sub-mechanism 31 for conveying. For "the first conveying sub-mechanism 31 may be driven by another sensor to generate the first conveying movement" described above, in some embodiments, the first conveying sub-mechanism 31 may include a drive sensor, the to-be-wiped item NB may be directly placed on the first conveying sub-mechanism 31 by the user, and after the drive sensor is triggered, the drive sensor generates a drive signal, and the first conveying sub-mechanism 31 generates the first conveying movement according to the drive signal; or the to-be-wiped item NB may be conveyed to the first conveying sub-mechanism 31 by another conveying belt, and after the drive sensor is triggered, the first conveying sub-mechanism 31 generates the first conveying movement according to the drive signal.

Figure 4:
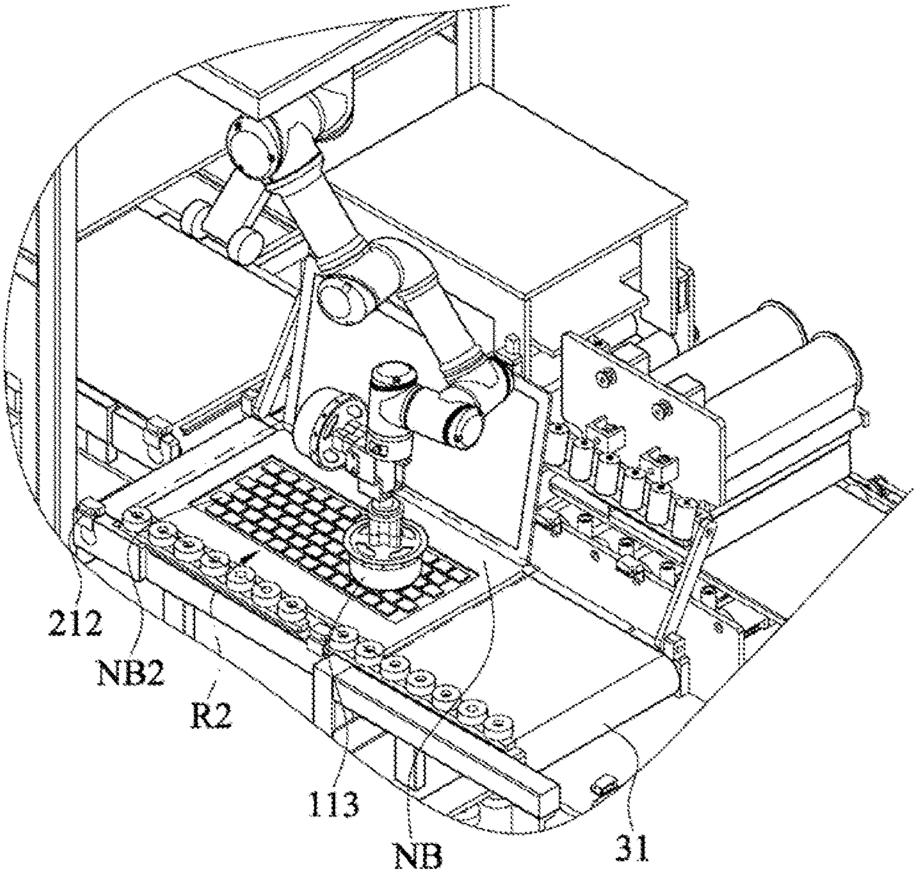
FIG. 4 is a schematic diagram of a second wiping motion in some embodiments of the present invention.

FIG. 4 is a schematic diagram of a second wiping motion in some embodiments of the present invention. As shown in FIG. 1 to FIG. 4, according to some embodiments, after the first wiping sub-mechanism 11 completes the first wiping motion, the first wiping sub-mechanism 11 starts the second wiping motion according to the second wiping parameter. According to some embodiments, the to-be-wiped item NB is a notebook computer, a second wiping range R2 is a range of a keyboard NB2 of the notebook computer, and the first wiping sub-mechanism 11 performs the second wiping motion according to the second wiping range R2 to clean the keyboard NB2. The second wiping range R2 may be greater than or equal to a size of the keyboard NB2. When the second wiping motion starts, the first wiping sub-mechanism 11 performs wiping in the second wiping range R2 according to the second wiping speed and the second wiping path by using the second wiping head 113. In some embodiments, after the first wiping sub-mechanism 11 completes the second wiping motion, the first conveying sub-mechanism 31 continues the first conveying movement (described later by using an example).

Referring to FIG. 2 and FIG. 3 again, according to some embodiments, the first conveying sub-mechanism 31 further includes a plurality of first stop members 311. The first stop members 311 are located on the side of the first conveying sub-mechanism 31, and the first stop members 311 correspond to the first wiping range R1. The first stop members 311 generate a stop effect in the first wiping range R1. For example, the to-be-wiped item NB is a notebook computer, and the first wiping range R1 is a screen NB1 of the notebook computer. When the first wiping sub-mechanism 11 performs the first wiping motion within the first wiping range R1, the first wiping sub-mechanism 11 is in contact with or abuts against the screen NB1, so that after the screen NB1 is pushed by the first wiping sub-mechanism 11, the screen NB1 abuts against the first stop member 311, and the first stop member 311 may stop the screen NB1. Therefore, during wiping of the screen NB1, the first wiping sub-mechanism 11 may maintain an effective contact force with the screen NB1.

For "after the first wiping sub-mechanism 11 completes the second wiping motion, the first conveying sub-mechanism 31 continues the first conveying movement" described above, in some embodiments, when the first wiping sub-mechanism 11 performs the second wiping motion, the first conveying sub-mechanism 31 stops the first conveying movement until the second wiping motion is completed, the first conveying sub-mechanism 31 may continue the first conveying movement according to the second wiping motion, and convey the to-be-wiped item NB to a next station. When the first conveying sub-mechanism 31 completes this operation according to the second wiping motion, the first conveying sub-mechanism 31 may stop for a preset time and then continue the first conveying movement again.

Figure 5:
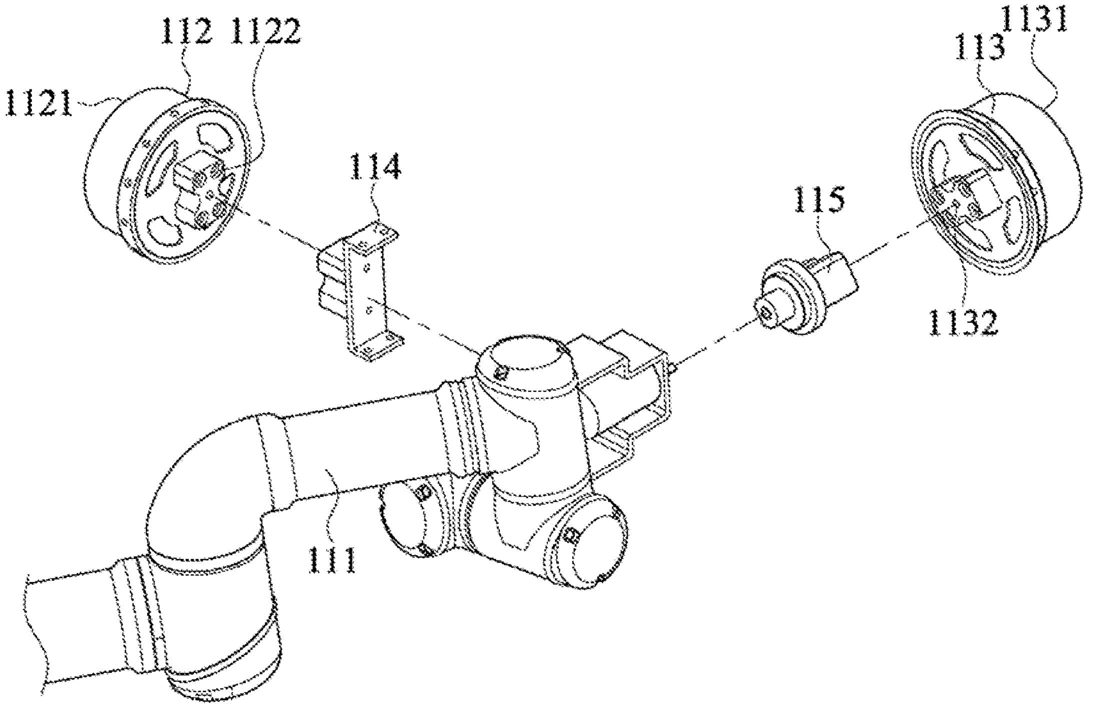
FIG. 5 is a partial exploded view of a first wiping sub-mechanism in some embodiments of the present invention.

FIG. 5 is a partial exploded view of a first wiping sub-mechanism in some embodiments of the present invention. As shown in FIG. 5, according to some embodiments, the first wiping head 112 includes a first wiping portion 1121 and a first fixing portion 1122, and the mechanical arm 111 includes a first opposite fixing portion 114. The first wiping portion 1121 is configured to wipe the to-be-wiped item NB, and the first wiping head 112 is disassembled and assembled to the first opposite fixing portion 114 by using the first fixing portion 1122. The second wiping head 113 includes a second wiping portion 1131 and a second fixing portion 1132, and the mechanical arm 111 includes a second opposite fixing portion 115. The second wiping portion 1131 is configured to wipe the to-be-wiped item NB, and the second wiping head 113 is disassembled and assembled to the second opposite fixing portion 115 by using the second fixing portion 1132. When the first wiping head 112 or the second wiping head 113 is dirty, the user may separately remove the first wiping head 112 or the second wiping head 113 from the mechanical arm 111 by using the first fixing portion 1122 or the second fixing portion 1132, and replace the first wiping head or the second wiping head with a clean wiping head 112 or a clean wiping head 113 to meet a cleaning requirement.

Figure 6:
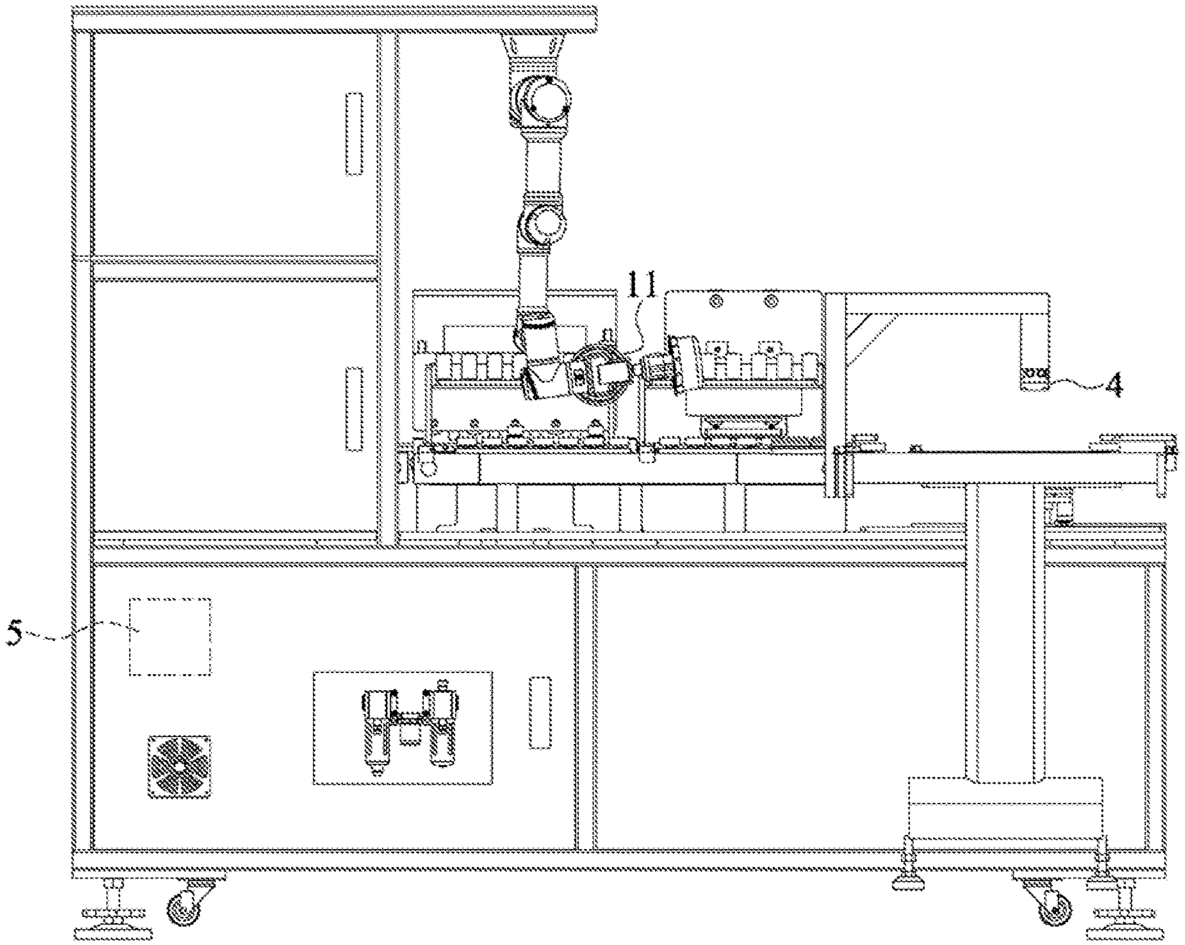
FIG. 6 is a side view of a wiping apparatus in some embodiments of the present invention.

FIG. 6 is a side view of a wiping apparatus in some embodiments of the present invention. As shown in FIG. 1 to FIG. 6, according to some embodiments, the wiping apparatus further includes a code scanning apparatus 4. The code scanning apparatus 4 obtains an identification code according to a code scanning signal. The code scanning apparatus 4 may generates a code scanning signal through a near-field communication (NFC) technology, a radio frequency identification technology, a light source scanning technology, or an image sensing technology. The identification code may be a one-dimensional barcode, a two-dimensional barcode, a radio frequency identification tag, or a short-range wireless communication chip. The code scanning apparatus 4 may generate a code scanning signal when being triggered, or the conveying mechanism 3 generates a code scanning signal after generating the first conveying movement, and both can be implemented. The code scanning apparatus 4 is set before the first wiping sub-mechanism 11, and before the first wiping sub-mechanism 11 performs the first wiping motion, the code scanning apparatus 4 may pre-scan an apparatus identification member of the to-be-wiped item NB to generate a code scanning signal. The identification code may be obtained by decoding the code scanning signal. Referring to the figure again, according to some embodiments, the wiping apparatus further includes a control apparatus 5. The control apparatus 5 obtains the first wiping parameter and the second wiping parameter according to the identification code. The control apparatus 5 may be a programmable logic controller (PLC), a central processing unit, a microcontroller, or a cloud computing server. According to some embodiments, the control apparatus 5 further obtains the third wiping parameter and the fourth wiping parameter according to the identification code. The control apparatus 5 is electrically connected to the wiping mechanism 1, the sensor set 2, the conveying mechanism 3, and the code scanning apparatus 4. The control apparatus 5 may include a database, and the database is used for storing the first wiping parameter, the second wiping parameter, the third wiping parameter, and the fourth wiping parameter, so that the control apparatus 5 searches the database for the wiping parameter corresponding to the identification code according to the identification code. The database may alternatively be a memory, and the first wiping parameter, the second wiping parameter, the third wiping parameter, and the fourth wiping parameter are stored in the memory. For example, after the control apparatus 5 retrieves the first wiping parameter or the second wiping parameter, the control apparatus 5 conveys the first wiping parameter or the second wiping parameter to the first wiping sub-mechanism 11, so that the first wiping sub-mechanism 11 performs the first wiping motion or the second wiping motion according to the first wiping parameter and the second wiping parameter.

Figure 7:
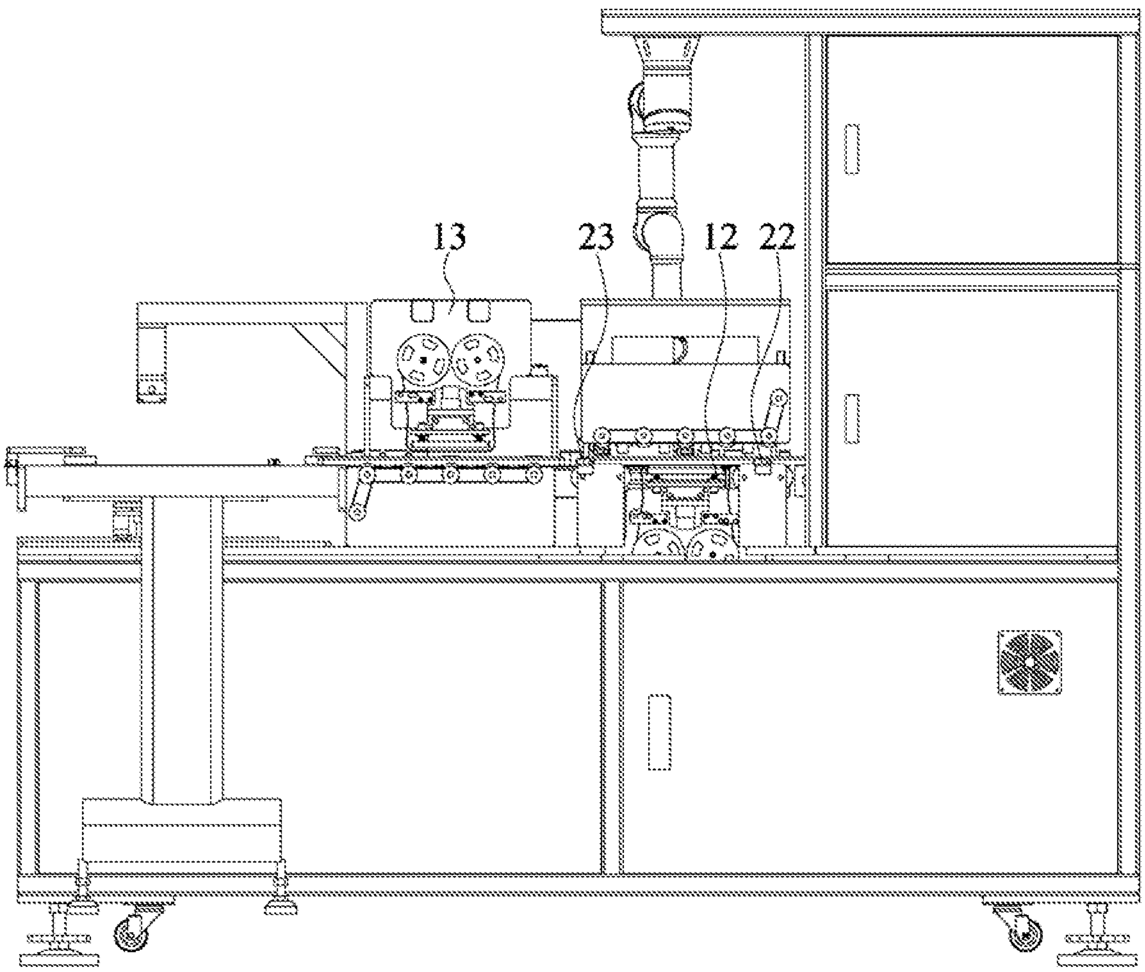
FIG. 7 is a side view of a wiping apparatus on the other side in some embodiments of the present invention.

FIG. 7 is a side view of a wiping apparatus on the other side in some embodiments of the present invention. As shown in FIG. 1 to FIG. 7, according to some embodiments, the wiping mechanism 1 further includes a second wiping sub-mechanism 12 and a third wiping sub-mechanism 13, one side of the second wiping sub-mechanism 12 corresponds to the first wiping sub-mechanism 11, and the third wiping sub-mechanism 13 corresponds to the other side of the second wiping sub-mechanism 12. The sensor set 2 further includes a second station sensor 22 and a third station sensor 23. The second station sensor 22 and the third station sensor 23 correspond to the second wiping sub-mechanism 12 and the third wiping sub-mechanism 13 respectively. The second station sensor 22 is configured to generate a second station signal, which may mean that the second station sensor 22 is triggered to generate a second station signal. The third station sensor 23 is configured to generate a third station signal, which may mean that the third station sensor 23 is triggered to generate a third station signal. The conveying mechanism 3 is configured to generate a second conveying movement and a third conveying movement, the second conveying movement responds to the second station signal, and the third conveying movement responds to the third station signal. The conveying mechanism 3 may generate the second conveying movement according to the second station signal, and generate the third conveying movement according to the third station signal. The second wiping sub-mechanism 12 generates a third wiping motion according to the second station signal and the third wiping parameter. The third wiping sub-mechanism 13 generates a fourth wiping motion according to the third station signal and the fourth wiping parameter. The second wiping sub-mechanism 12 may immediately start the third wiping motion or the fourth wiping motion, or stop for a predetermined time and then start the third wiping motion or the fourth wiping motion again. The predetermined time may be set according to a process requirement.

According to some embodiments, the third wiping motion is wiping a baseplate of a notebook computer, and the fourth wiping motion is wiping an upper cover of the notebook computer; or the third wiping motion is wiping an upper cover of a notebook computer, and the fourth wiping motion is wiping a baseplate of the notebook computer. The third wiping parameter includes a third wiping range. The second wiping sub-mechanism 12 performs the third wiping motion within the third wiping range. The third wiping parameter further includes a third wiping speed and a third wiping path. The second wiping sub-mechanism 12 performs the third wiping motion within the third wiping range according to the third wiping speed and the third wiping path. The fourth wiping parameter includes a fourth wiping range, and the third wiping sub-mechanism 13 performs the fourth wiping motion within the fourth wiping range. The fourth wiping parameter further includes a fourth wiping speed and a fourth wiping path, and the third wiping sub-mechanism 13 performs the fourth wiping motion within the fourth wiping range according to the fourth wiping speed and the fourth wiping path.

Figure 8:
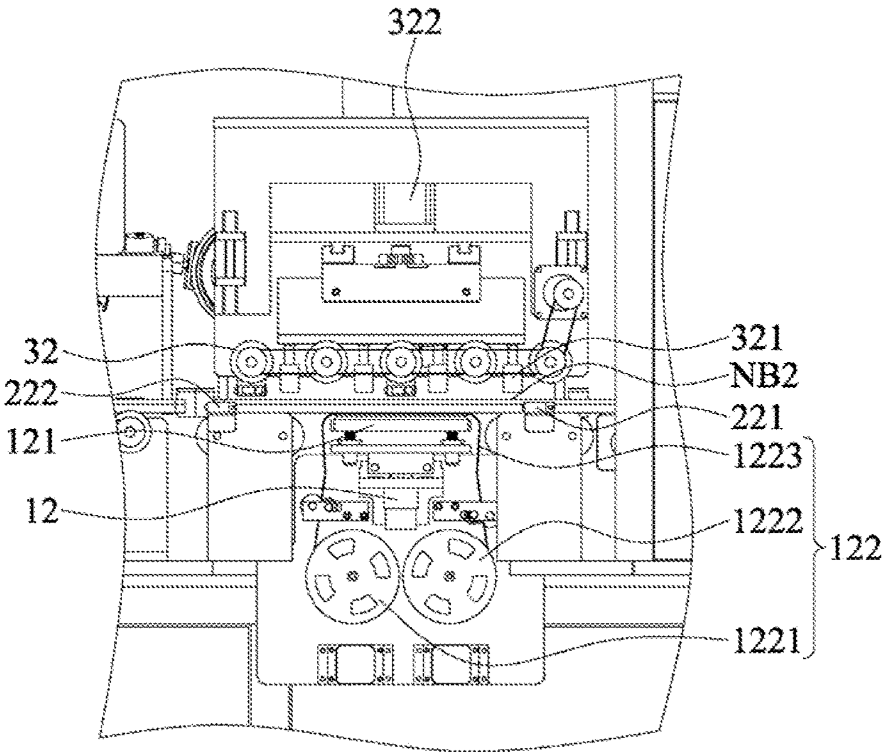
FIG. 8 is a side view of a wiping apparatus at a second station in some embodiments of the present invention.

FIG. 8 is a side view of a wiping apparatus at a second station in some embodiments of the present invention. As shown in FIG. 1 to FIG. 8, according to some embodiments, the second station sensor 22 further includes a second start sensor 221 and a second end sensor 222. The second start sensor 221 and the second end sensor 222 are located on two side of the second wiping sub-mechanism 12 respectively. The second station signal includes a second start signal and a second end signal. The second start sensor 221 is configured to generate the second start signal, which may mean that the second start sensor 221 is triggered to generate the second start signal. The second end sensor 222 is configured to generate the second end signal, which may mean that the second end sensor 222 is triggered to generate the second end signal. The third wiping motion responds to the second start signal and the second end signal, which may mean that the second wiping sub-mechanism 12 starts the third wiping motion according to the second start signal, and stop the third wiping motion according to the second end signal. The conveying mechanism 3 includes a second conveying sub-mechanism 32, and the second conveying sub-mechanism 32 responds to the second wiping sub-mechanism 12. The second conveying sub-mechanism 32 is configured to generate the second conveying movement, and the second conveying movement responds to the second start signal and the second end signal, which may mean that the second conveying sub-mechanism 32 starts the second conveying movement according to the second start signal, and stops the second conveying movement according to the second end signal.

Referring to FIG. 8 again, according to some embodiments, the second wiping sub-mechanism 12 includes a first reciprocating movement set 121. The first reciprocating movement set 121 performs a reciprocating movement within the third wiping range. The second wiping sub-mechanism 12 further includes a first winding roller set 122. The second wiping sub-mechanism 12 drives, according to an automatic winding parameter, the first winding roller set 122 to start a winding movement, the first winding roller set 122 further includes a first feeding member 1221 and a first receiving member 1222, and the first winding roller set 122 is configured to feed a wiping cloth 1223 to the first receiving member 1222. In some embodiments, the first feeding member 1221 includes the wiping cloth 1223. The first winding roller set 122 is configured to feed the wiping cloth to the first receiving member 1222, which may mean that after the first winding roller set 122 starts the winding movement, the first feeding member 1221 may feed the wiping cloth 1223 to the first receiving member 1222. The first reciprocating movement set 121 is located between the first feeding member 1221 and the first receiving member 1222, and the wiping cloth 1223 is exposed from the first reciprocating movement set 121, so that the first reciprocating movement set 121 may perform the third wiping motion by using the wiping cloth 1223. The automatic winding parameter may be the number of times that the first reciprocating movement set 121 performs the third wiping motion or a usage time of the first reciprocating movement set 121.

Referring to FIG. 8 again, according to some embodiments, the second conveying sub-mechanism 32 further includes a second stop member 321. The second stop member 321 is located on two sides of the second conveying sub-mechanism 32, and the second conveying sub-mechanism 32 further includes a lifting member 322. When the second conveying sub-mechanism 32 performs the second conveying movement according to the second start signal, the lifting member 322 may drive the second conveying sub-mechanism 32 to move up and down, and push the second conveying sub-mechanism 32 to the second wiping sub-mechanism 12, so that the second conveying sub-mechanism 32 approaches the second wiping sub-mechanism 12, and the second stop member 321 may correspond to a periphery of the third wiping range. Accordingly, during wiping of the third wiping motion, the to-be-wiped item NB may be stopped by the second stop member 321, and the to-be-wiped item NB is maintained in a conveying path of the third conveying movement. According to some embodiments, in an example in which the third wiping range is the baseplate of the notebook computer, the second wiping sub-mechanism 12 corresponds to the baseplate of the notebook computer, the second conveying sub-mechanism 32 corresponds to the upper cover of the notebook computer, the lifting member 322 drives the second conveying sub-mechanism 32 according to the third start signal, so that the second conveying sub-mechanism 32 is in contact with the upper cover of the notebook computer, and the notebook computer is conveyed (that is, the third conveying movement is performed) through the second conveying sub-mechanism 32.

Figure 9:
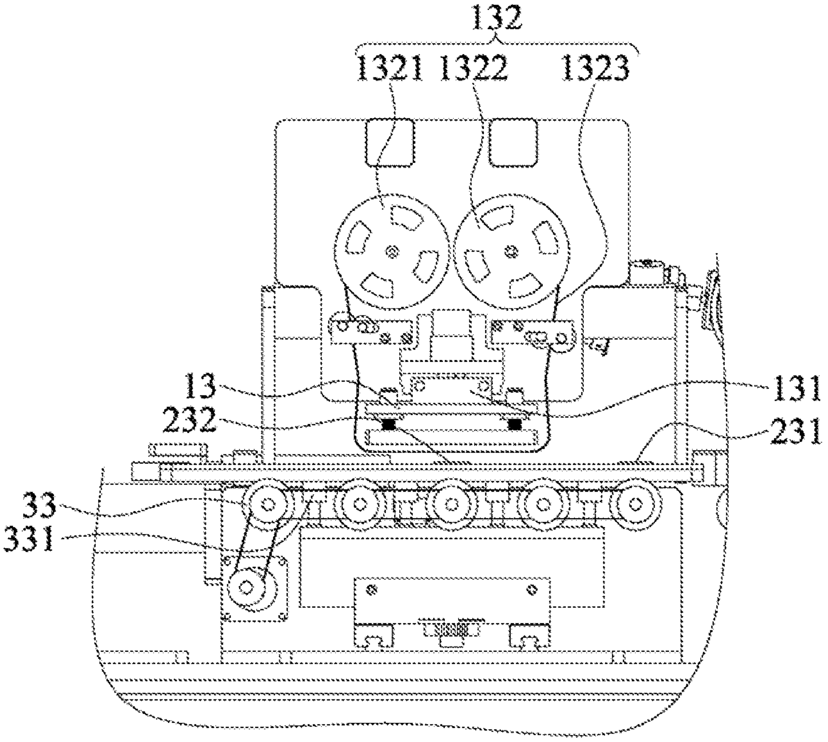
FIG. 9 is a side view of a wiping apparatus at a third station in some embodiments of the present invention.

FIG. 9 is a side view of a wiping apparatus at a third station in some embodiments of the present invention. As shown in FIG. 1 to FIG. 9, according to some embodiments, the third station sensor 23 further includes a third start sensor 231 and a third end sensor 232. The third start sensor 231 and the third end sensor 232 are located on two sides of the third wiping sub-mechanism 13 respectively. The third station signal includes a third start signal and a third end signal. The third start sensor 231 is triggered to generate the third start signal, and the third end sensor 232 is triggered to generate the third end signal. The fourth wiping motion responds to the third start signal and the third end signal, which may mean that the third wiping sub-mechanism 13 starts the fourth wiping motion according to the third start signal, and stops the fourth wiping motion according to the third end signal. The conveying mechanism 3 includes a third conveying sub-mechanism 33, and the third conveying sub-mechanism 33 responds to the third wiping sub-mechanism 13. The third conveying sub-mechanism 33 is configured to generate the third conveying movement, and the third conveying movement responds to the third start signal and the third end signal, which may mean that the third conveying sub-mechanism 33 starts the third conveying movement according to the third start signal, and stops the third conveying movement according to the third end signal.

Referring to FIG. 9 again, according to some embodiments, the third wiping sub-mechanism 13 further includes a second reciprocating movement set 131. The second reciprocating movement set 131 performs a reciprocating movement within the fourth wiping range. The third wiping sub-mechanism 13 further includes a second winding roller set 132. The third wiping sub-mechanism 13 drives the second winding roller set 132 to start a winding movement according to an automatic winding parameter. The second winding roller set 132 further includes a second feeding member 1321 and a second receiving member 1322. In some embodiments, the second feeding member 1321 has another wiping cloth 1323. The second feeding member 1321 is configured to feed the another wiping cloth 1323 to the second receiving member 1322, which may mean that after the second winding roller set 132 starts the winding movement, the second feeding member 1321 may feed the wiping cloth 1323 to the second receiving member 1322. The second reciprocating movement set 131 is located between the second feeding member 1321 and the second receiving member 1322, and the wiping cloth 1323 is exposed from the second reciprocating movement set 131, so that the second reciprocating movement set 131 may perform the fourth wiping motion by using the wiping cloth 1323. The automatic winding parameter may be the number of times that the second reciprocating movement set 131 performs the fourth wiping motion or a usage time of the second reciprocating movement set 131.

Referring to FIG. 9 again, according to some embodiments, the third conveying sub-mechanism 33 further includes a third stop member 331. The third stop member 331 is located on two sides of the third conveying sub-mechanism 33, and corresponds to a periphery of the fourth wiping range. Accordingly, during wiping of the fourth wiping motion on the to-be-wiped item NB, the to-be-wiped item NB may be stopped by the third stop member 331, and the to-be-wiped item NB is maintained in a conveying path of the third conveying movement.

Figure 10:
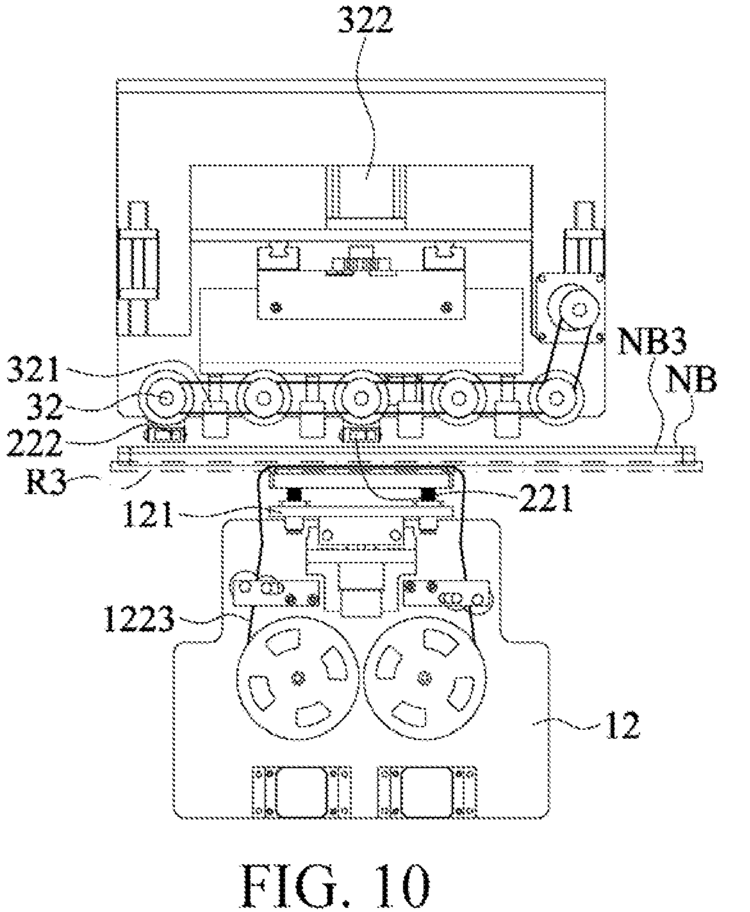
FIG. 10 is a schematic diagram of a third wiping motion in some embodiments of the present invention.
Figure 11:
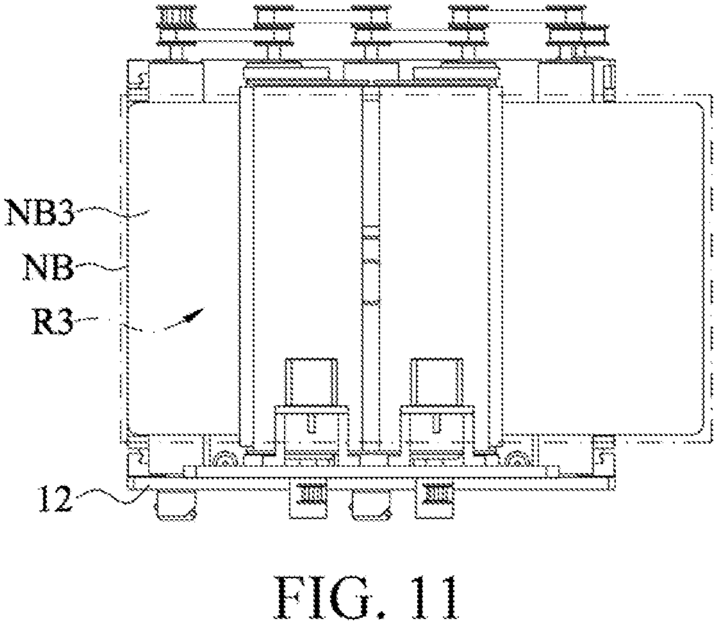
FIG. 11 is a bottom view of a wiping apparatus at a second station in some embodiments of the present invention.

FIG. 10 is a schematic diagram of a third wiping motion in some embodiments of the present invention. FIG. 11 is a bottom view of a wiping apparatus at a second station in some embodiments of the present invention. As shown in FIG. 1 to FIG. 11, according to some embodiments, when the second start sensor 221 senses the to-be-wiped item NB, the second start sensor 221 may be triggered to generate the second start signal. The second conveying sub-mechanism 32 starts the second conveying movement according to the second start signal, and the second wiping sub-mechanism 12 starts the third wiping motion according to a third wiping parameter and the second start signal. In some embodiments, the to-be-wiped item NB is a notebook computer, the third wiping range R3 corresponds to a baseplate NB3 of the notebook computer, and the second wiping sub-mechanism 12 performs a third wiping motion according to the third wiping range R3 to clean the baseplate NB3. The third wiping range R3 is greater than or equal to a size of the baseplate NB3. When the third wiping motion starts, the first reciprocating movement set 121 performs reciprocating wiping back and forth within the third wiping range R3 by using the wiping cloth 1223. During the third wiping motion, the second conveying sub-mechanism 32 continues to perform the second conveying movement. When the second end sensor 222 senses the to-be-wiped item NB, the second end sensor 222 may be triggered to generate a second end signal. The second conveying sub-mechanism 32 stops the second conveying movement according to the second end signal, and the second wiping sub-mechanism 12 stops the third wiping motion according to the second end signal.

Referring to FIG. 4 and FIG. 10, according to some embodiments, the first conveying sub-mechanism 31 is connected to the second conveying sub-mechanism 32. After the first wiping sub-mechanism 11 completes the second wiping motion, the first conveying sub-mechanism 31 continues the first conveying movement according to the second wiping motion, so that the to-be-wiped item NB is conveyed to the second conveying sub-mechanism 32 through the first conveying sub-mechanism 31, and in a process of conveying to the second conveying sub-mechanism 32, the to-be-wiped item NB triggers the second start sensor 221 to generate the second start signal. Therefore, after the first wiping motion and the second wiping motion are completed, the to-be-wiped item NB may be conveyed to the second conveying sub-mechanism 32 through the first conveying sub-mechanism 31 for the second wiping sub-mechanism 12 to perform the third wiping motion, and after the third wiping motion is completed, the to-be-wiped item NB is conveyed to the third conveying sub-mechanism 33 for the third wiping sub-mechanism 13 to perform the fourth wiping motion.

According to some embodiments, an area of the second wiping sub-mechanism 12 for single reciprocating wiping is less than the third wiping range R3. Therefore, through the second conveying movement of the second conveying sub-mechanism 32, during conveying of the to-be-wiped item NB, the second wiping sub-mechanism 12 gradually completes the wiping of the third wiping range R3 (the baseplate of the notebook computer), and when the second conveying movement stops, the wiping of the third wiping range R3 can be completed.

According to some embodiments, when the second conveying sub-mechanism 32 starts the second conveying movement according to the second start signal, the lifting member 322 pushes the second conveying sub-mechanism 32, so that the second conveying sub-mechanism 32 is in contact with the to-be-wiped item NB to perform the second conveying movement. When the second conveying sub-mechanism 32 is in contact with the to-be-wiped item NB, the second stop member 321 corresponds to two sides of the to-be-wiped item NB. When the second wiping sub-mechanism 12 performs the third wiping motion, the second stop member 321 may stop the to-be-wiped item NB, so that the to-be-wiped item NB is maintained in a conveying path of the second conveying sub-mechanism 32 during conveying. When the second conveying sub-mechanism 32 stops the second conveying movement according to the second end signal, the lifting member 322 may reset the second conveying sub-mechanism 32.

According to some embodiments, to effectively utilize a space of the wiping apparatus, the second end sensor 222 is disposed close to the second wiping sub-mechanism 12, and a distance between the second end sensor 222 and the second wiping sub-mechanism 12 is less than a length of the to-be-wiped item NB. When the second end sensor 222 is triggered by the two ends of the to-be-wiped item NB, the second end sensor 222 generates the second end signal after being triggered twice. That is, during the second conveying movement of the to-be-wiped item NB, when one end of the to-be-wiped item NB first triggers the second end sensor 222, the second end sensor 222 does not generate the second end signal immediately. Only when the other end of the to-be-wiped item NB also triggers the second end sensor 222, the second end sensor 222 generates the second end signal. In a case in which the two ends of the to-be-wiped item NB trigger the second end sensor 222, it indicates that the to-be-wiped item NB has been wiped. In this way, when the distance between the second end sensor 222 and the second wiping sub-mechanism 12 is less than the length of the to-be-wiped item NB, it can still be ensured that the to-be-wiped item NB has been wiped, and the second conveying sub-mechanism 32 stops the second conveying movement according to the second end signal.

Figure 12:
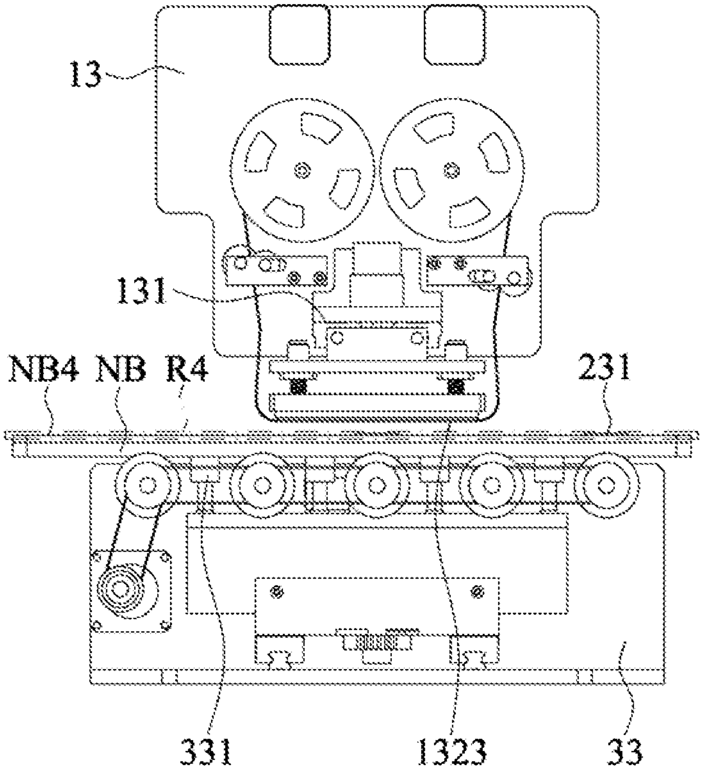
FIG. 12 is a schematic diagram of a fourth wiping motion in some embodiments of the present invention.
Figure 13:
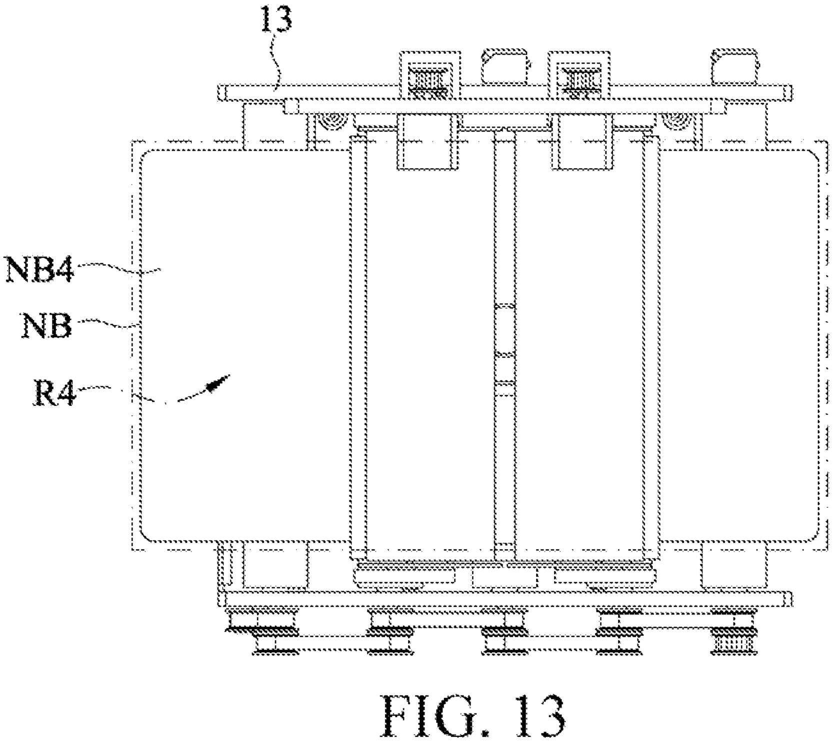
FIG. 13 is a top view of a wiping apparatus at a third station in some embodiments of the present invention.

FIG. 12 is a schematic diagram of a fourth wiping motion in some embodiments of the present invention. FIG. 13 is a top view of a wiping apparatus at a third station in some embodiments of the present invention. As shown in FIG. 1 to FIG. 13, according to some embodiments, the to-be-wiped item NB is a notebook computer. When the third start sensor 231 senses the to-be-wiped item NB, the third start sensor 231 may be triggered to generate the third start signal. The third conveying sub-mechanism 33 starts a third conveying movement according to the third start signal. The third wiping sub-mechanism 13 generates a fourth wiping motion according to a fourth wiping parameter and the third start signal. The fourth wiping range R4 may be a range of an upper cover NB4 of a notebook computer. The third wiping sub-mechanism 13 performs the fourth wiping motion according to the fourth wiping range R4 to clean the upper cover NB4. The fourth wiping range R4 is greater than or equal to a size of the upper cover NB4. When the fourth wiping motion starts, the second reciprocating movement set 131 performs reciprocating wiping within the fourth wiping range R4 by using the wiping cloth 1323. During the fourth wiping motion, the third conveying sub-mechanism 33 continues to perform the third conveying movement. When the third end sensor 232 senses the to-be-wiped item NB, the third end sensor 232 may be triggered to generate the third end signal. The third conveying sub-mechanism 33 stops the third conveying movement according to the third end signal. The third wiping sub-mechanism 13 stops the fourth wiping motion according to the third end signal. When the second conveying sub-mechanism 32 and the third conveying sub-mechanism 33 are connected to each other, and the second conveying sub-mechanism 32 stops the third conveying movement according to the third end signal, in this case, the to-be-wiped item NB is already located in the third conveying sub-mechanism 33, and may trigger the third sensor 231 to generate the third start signal, so that the third conveying sub-mechanism 33 may convey the to-be-wiped item NB.

According to some embodiments, during the third conveying movement of the to-be-wiped item NB, because the third wiping sub-mechanism 13 continues to perform the fourth wiping motion on the to-be-wiped item NB, the third stop member 331 located on the two sides of the third conveying sub-mechanism 33 may stop the to-be-wiped item NB, so that the to-be-wiped item NB is maintained in the conveying path of the third conveying sub-mechanism 33, to prevent the to-be-wiped item NB from being interfered by an acting force of the fourth wiping motion during conveying to leave the conveying path of the third conveying sub-mechanism 33.

According to some embodiments, to effectively utilize the space of the wiping apparatus, the third end sensor 232 is disposed at a periphery of the third wiping sub-mechanism 13, and a distance between the third end sensor 232 and the third wiping sub-mechanism 13 is less than the length of the to-be-wiped item NB. When the third end sensor 232 is triggered by the two ends of the to-be-wiped item NB, the third end sensor 232 generates the third end signal after being triggered twice. That is, during the third conveying movement of the to-be-wiped item NB, when one end of the to-be-wiped item NB first triggers the third end sensor 232, the third end sensor 232 does not generate the third end signal immediately. Only when the other end of the to-be-wiped item NB also triggers the third end sensor 232, the third end sensor 232 generates the third end signal. In a case in which the two ends of the to-be-wiped item NB trigger the third end sensor 232, it indicates that the to-be-wiped item NB has been wiped. In this way, when the distance between the third end sensor 232 and the third wiping sub-mechanism 13 is less than the length of the to-be-wiped item NB, it can still be ensured that the to-be-wiped item NB has been wiped, and the third conveying sub-mechanism 33 stops the third conveying movement according to the second end signal.

Figure 14:
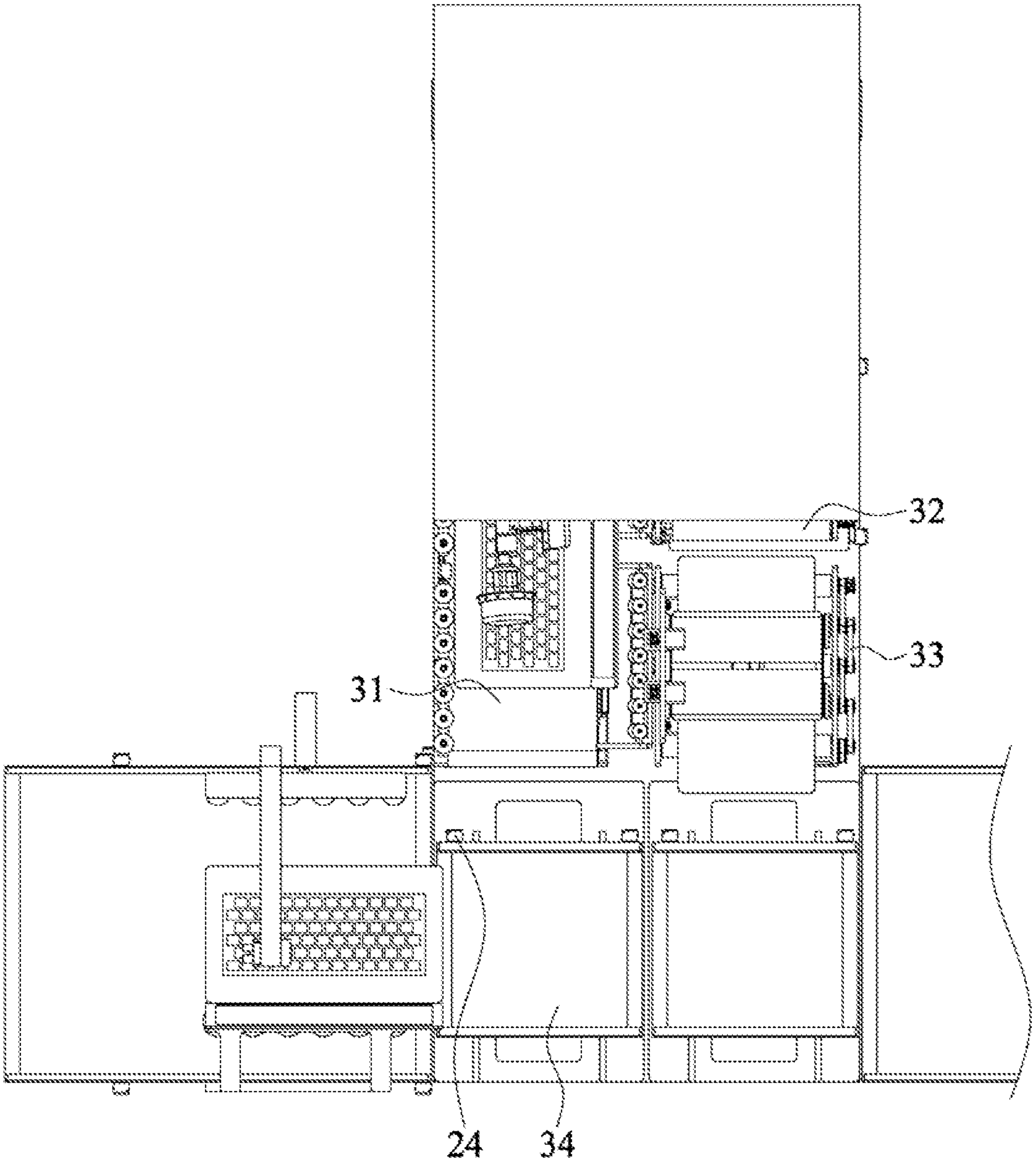
FIG. 14 is a top view of a fourth conveying sub-mechanism in some embodiments of the present invention.
Figure 15:
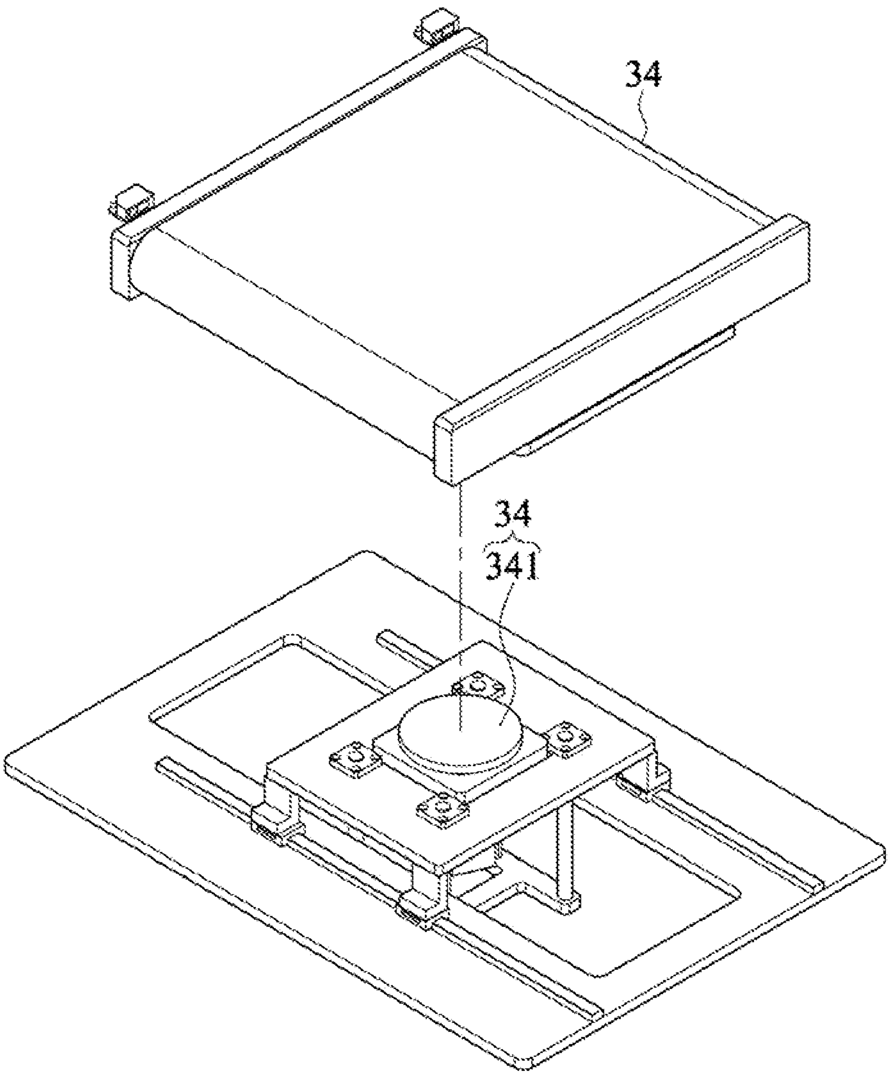
FIG. 15 is an exploded view of a fourth conveying sub-mechanism in some embodiments of the present invention.

FIG. 14 is a top view of a fourth conveying sub-mechanism in some embodiments of the present invention. FIG. 15 is an exploded view of a fourth conveying sub-mechanism in some embodiments of the present invention. As shown in FIG. 1 to FIG. 15, according to some embodiments, the conveying mechanism 3 further includes a fourth conveying sub-mechanism 34. The fourth conveying sub-mechanism 34 is connected to the first conveying sub-mechanism 31, the second conveying sub-mechanism 32, or the third conveying sub-mechanism 33. The sensor set 2 further includes a fourth station sensor 24. The fourth station sensor 24 is configured to generate a fourth station signal, which may mean that the fourth station sensor 24 is triggered to generate the fourth station signal. The fourth conveying sub-mechanism 34 is configured to generate a fourth conveying movement. In some embodiments, the fourth station signal includes a fourth start signal and a fourth end signal, the fourth end signal responds to the fourth start signal, and the fourth station signal may include only one of the fourth start signal or the fourth end signal. “The fourth end signal responds to the fourth start signal” described above may mean that after the fourth station sensor 24 is triggered, the fourth station sensor 24 generates the fourth start signal, and generates the fourth end signal after a preset time. The preset time may be a start time or an end time of the fourth conveying movement. The fourth conveying movement responding to the fourth station signal may mean that the fourth conveying sub-mechanism 34 starts the fourth conveying movement according to the fourth start signal, stops the fourth conveying movement according to the fourth end signal, and returns to a start position, which may mean that the fourth conveying sub-mechanism 34 starts the fourth conveying movement according to the fourth start signal (or the fourth end signal), stops the fourth conveying movement after the fourth start signal (or the fourth end signal) ends, and returns to the start position. The fourth conveying movement may include a planar rotation movement, a lifting movement, and a conveying movement.

Referring to FIG. 15 again, according to some embodiments, the fourth conveying sub-mechanism 34 further includes a rotation stage 341, and the rotation stage 341 is configured to generate the fourth conveying movement. The rotation stage 341 includes a steering mechanism and a lifting mechanism, so that the rotation stage 341 may perform planar rotation relative to the fourth conveying sub-mechanism 34 through the steering mechanism, and may be lifted relative to the fourth conveying sub-mechanism 34 through the lifting mechanism. The fourth conveying sub-mechanism 34 provides a change of a conveying direction according to a production line space. For example, when the fourth conveying sub-mechanism 34 is disposed at a front end of the first conveying sub-mechanism 31, after receiving the to-be-wiped item NB, the fourth conveying sub-mechanism 34 may perform steering according to a direction of the first conveying movement of the first conveying sub-mechanism 31 through the rotation stage 341, so that the to-be-wiped item NB may be conveyed to the first conveying sub-mechanism 31 in a correct direction, and the first wiping sub-mechanism 11 may perform the first wiping motion at an appropriate angle. When there is a height difference between the first conveying sub-mechanism 31 and the fourth conveying sub-mechanism 34, lifting may be performed through the rotation stage 341, so that the first conveying sub-mechanism 31 and the fourth conveying sub-mechanism 34 have a same height, and the to-be-wiped item NB can be stably conveyed to the first conveying sub-mechanism 31. Therefore, the wiping apparatus can make space configuration of production lines more flexible and reduce the overall usage space through the fourth conveying sub-mechanism 34.

Figure 16:
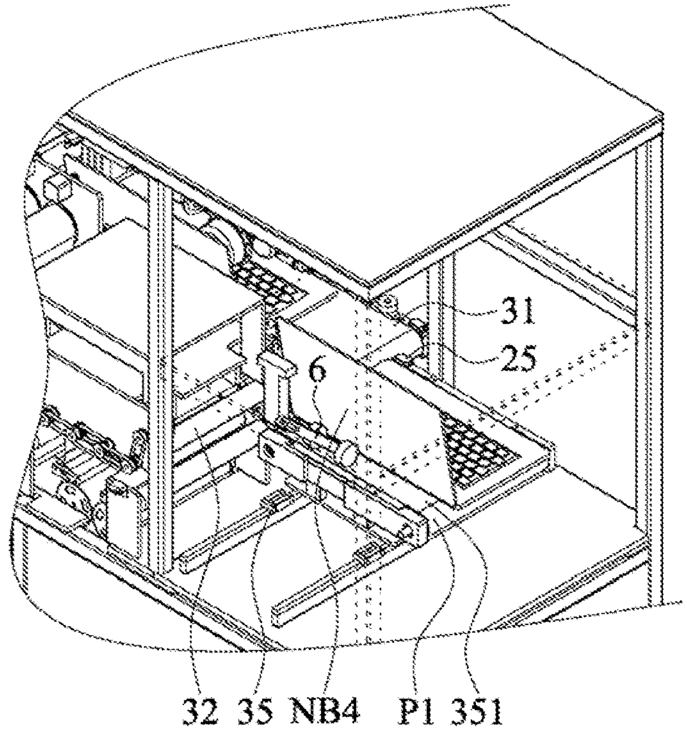
FIG. 16 is a schematic diagram of a fifth conveying sub-mechanism at a first position in some embodiments of the present invention.
Figure 17:
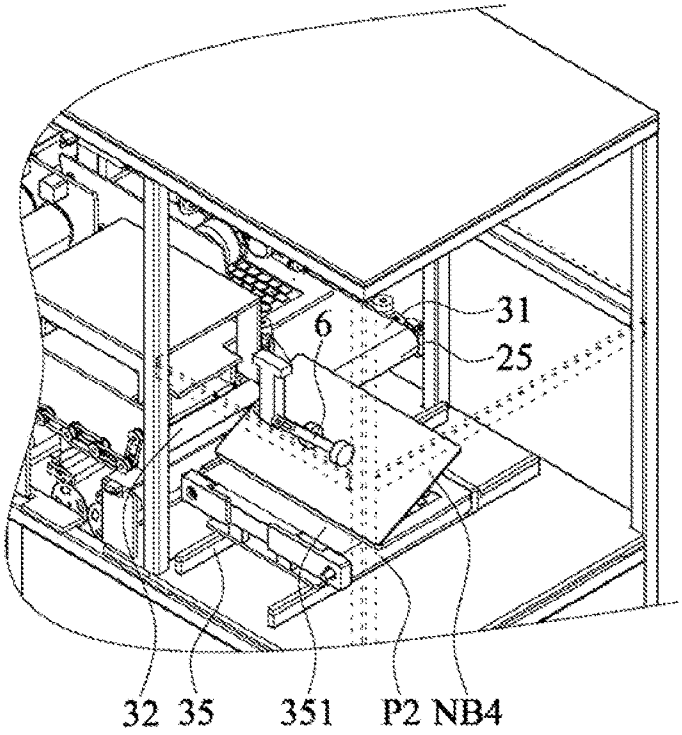
FIG. 17 is a schematic diagram of a fifth conveying sub-mechanism at a second position in some embodiments of the present invention.

FIG. 16 is a schematic diagram of a fifth conveying sub-mechanism at a first position in some embodiments of the present invention. FIG. 17 is a schematic diagram of a fifth conveying sub-mechanism at a second position in some embodiments of the present invention. As shown in FIG. 1 to FIG. 17, according to some embodiments, the wiping apparatus further includes a push rod member 6. The push rod member 6 is located between the first conveying sub-mechanism 31 and the second conveying sub-mechanism 32. The conveying mechanism 3 further includes a fifth conveying sub-mechanism 35, and the fifth conveying sub-mechanism 35 includes a translation stage 351. The translation stage 351 is located between the first conveying sub-mechanism 31 and the second conveying sub-mechanism 32, and the translation stage 351 corresponds to the push rod member 6. The sensor set 2 further includes a fifth station sensor 25, and the fifth station sensor 25 corresponds to the fifth conveying sub-mechanism 35. The fifth station sensor 25 is configured to generate a fifth station signal, which may mean that the fifth station sensor 25 is triggered to generate the fifth station signal. The fifth conveying sub-mechanism 35 is configured to generate a fifth conveying movement, and the fifth conveying movement responds to the fifth station signal, which may mean that the fifth conveying sub-mechanism 35 generates the fifth conveying movement according to the fifth station signal. The translation stage 351 performs conveying between the first conveying sub-mechanism 31 and the second conveying sub-mechanism 32 according to the fifth conveying movement. The fifth conveying movement includes a first position P1 and a second position P2, and the translation stage 351 is displaced at the first position P1 and the second position P2. When being at the first position P1, the translation stage 351 may be connected to the first conveying sub-mechanism 31, to receive the to-be-wiped item NB conveyed by the first conveying sub-mechanism 31. When being at the second position P2, the translation stage 351 may be connected to the second conveying sub-mechanism 32, to convey the to-be-wiped item NB to the second conveying sub-mechanism 32. When the translation stage 351 is at the second position P2, the translation stage 351 corresponds to the push rod member 6 at the second position P2. As shown in FIG. 15, when translation stage 351 is at the first position P1, the translation stage 351 corresponds to the first conveying sub-mechanism 31, so that the translation stage 351 may receive the to-be-wiped item NB from the first conveying sub-mechanism 31 to trigger the fifth station sensor 25. After the fifth station sensor 25 generates the fifth station signal, the fifth conveying sub-mechanism 35 starts the fifth conveying movement according to the fifth station signal, and the translation stage 351 moves from the first position P1 to the second position P2. When the translation stage 351 is at the second position P2, the translation stage 351 corresponds to the second conveying sub-mechanism 32, and conveys the to-be-wiped item NB to the second conveying sub-mechanism 32. When the translation stage 351 moves from the first position P1 to the second position P2, due to the height difference between the push rod member 6 and the translation stage 351, the push rod member 6 may generate a push and height limiting effect during the fifth conveying movement, and the push rod member 6 may push the upper cover NB4 of the to-be-wiped item NB, so that the upper cover NB4 is changed from an open state to a closed state after being pushed. The height difference between the push rod member 6 and the translation stage 351 may be set according to the size of the upper cover NB4 of the to-be-wiped item NB. As long as the translation stage 351 is at the second position P2, the push rod member 6 pushes the upper cover NB4, and is enough to make the upper cover NB4 change to the closed state without affecting the movement of the translation stage 351, and both can be implemented.

In summary, when the user performs an automatic wiping operation on a to-be-wiped product by using the wiping apparatus, after the user may place the to-be-wiped product in the conveying mechanism for conveying, and the to-be-wiped product triggers the sensor set to generate the first station signal, the wiping mechanism may perform the first wiping motion and the second wiping motion on the to-be-wiped product according to the first station signal, the first wiping parameter, and the second wiping parameter. Alternatively, the wiping mechanism may separately perform the third wiping motion and the fourth wiping motion according to the second station signal and the third wiping parameter, and the third station signal and the fourth wiping parameter. Accordingly, the wiping apparatus may complete the wiping operation of different parts at a single workstation. In an example in which the to-be-wiped product is the notebook computer, the wiping apparatus may wipe the screen and the keyboard of the notebook computer, or wipe the upper cover and the baseplate of the notebook computer, thereby saving the operation time of switching between different wiping parts of the to-be-wiped product, and also improving the wiping efficiency and reducing the apparatus building cost.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A wiping apparatus, comprising:

a wiping mechanism;

a sensor set, comprising a first station sensor, wherein the first station sensor corresponds to the wiping mechanism, and the first station sensor is configured to generate a first station signal; and a conveying mechanism, corresponding to the wiping mechanism, wherein the conveying mechanism is configured to generate a first conveying movement, and the first conveying movement responds to the first station signal, wherein the wiping mechanism generates a first wiping motion according to the first station signal and a first wiping parameter, and the wiping mechanism generates a second wiping motion according to the first wiping motion and a second wiping parameter;

the first station sensor comprises a first start sensor and a first end sensor, and the first station signal comprises a first start signal and a first end signal;

the first start sensor corresponds to one side of the wiping mechanism, and the first start sensor is configured to generate the first start signal;

the first end sensor corresponds to the other side of the wiping mechanism, and the first end sensor is configured to generate the first end signal;

the conveying mechanism comprises a first conveying sub-mechanism, and two sides of the first conveying sub-mechanism correspond to the first start sensor and the first end sensor respectively, the first conveying sub-mechanism is configured to generate the first conveying movement, and the first conveying movement responds to the first start signal; and the wiping mechanism comprises a first wiping sub-mechanism, two sides of the first wiping sub-mechanism correspond to the first start sensor and the first end sensor respectively, and the first wiping sub-mechanism is configured to generate the first wiping motion and the second wiping motion.

2. The wiping apparatus according to claim 1, wherein the first wiping parameter comprises a first wiping range, the first wiping sub-mechanism performs the first wiping motion within the first wiping range, the second wiping parameter comprises a second wiping range, and the first wiping sub-mechanism performs the second wiping motion within the second wiping range.

3. The wiping apparatus according to claim 2, wherein the first wiping parameter further comprises a first wiping speed and a first wiping path, the first wiping sub-mechanism performs the first wiping motion within the first wiping range according to the first wiping speed and the first wiping path, the second wiping parameter further comprises a second wiping speed and a second wiping path, and the first wiping sub-mechanism performs the second wiping motion within the second wiping range according to the second wiping speed and the second wiping path.

4. The wiping apparatus according to claim 3, wherein the first wiping sub-mechanism comprises a mechanical arm, a first wiping head, and a second wiping head, the first wiping head and the second wiping head are separately connected to the mechanical arm and driven by the mechanical arm, so that the first wiping head performs the first wiping motion within the first wiping range, and the second wiping head performs the second wiping motion within the second wiping range.

5. The wiping apparatus according to claim 4, wherein the first wiping head comprises a first wiping portion and a first fixing portion, the first wiping head is disassembled and assembled to the mechanical arm through the first fixing portion, the second wiping head comprises a second wiping portion and a second fixing portion, and the second wiping head is disassembled and assembled to the mechanical arm through the second fixing portion.

6. The wiping apparatus according to claim 5, wherein the first conveying sub-mechanism comprises a plurality of first stop members, each of the first stop members is located on one side of the first conveying sub-mechanism, and each of the first stop members corresponds to the first wiping range to generate a stop effect.

7. A wiping apparatus, comprising:

a wiping mechanism;

a sensor set, comprising a first station sensor, wherein the first station sensor corresponds to the wiping mechanism, and the first station sensor is configured to generate a first station signal;

a conveying mechanism, corresponding to the wiping mechanism, wherein the conveying mechanism is configured to generate a first conveying movement, and the first conveying movement responds to the first station signal;

a code scanning apparatus, obtaining an identification code according to a code scanning signal; and a control apparatus, obtaining a first wiping parameter and a second wiping parameter according to the identification code, wherein the wiping mechanism generates a first wiping motion according to the first station signal and the first wiping parameter, and the wiping mechanism generates a second wiping motion according to the first wiping motion and the second wiping parameter.

8. The wiping apparatus according to claim 7, wherein the first station sensor comprises a first start sensor and a first end sensor, and the first station signal comprises a first start signal and a first end signal;

the first start sensor corresponds to one side of the wiping mechanism, and the first start sensor is configured to generate the first start signal;

the first end sensor corresponds to the other side of the wiping mechanism, and the first end sensor is configured to generate the first end signal;

the conveying mechanism comprises a first conveying sub-mechanism, and two sides of the first conveying sub-mechanism correspond to the first start sensor and the first end sensor respectively, the first conveying sub-mechanism is configured to generate the first conveying movement, and the first conveying movement responds to the first start signal; and the wiping mechanism comprises a first wiping sub-mechanism, two sides of the first wiping sub-mechanism correspond to the first start sensor and the first end sensor respectively, and the first wiping sub-mechanism is configured to generate the first wiping motion and the second wiping motion.

9. The wiping apparatus according to claim 8, wherein the wiping mechanism further comprises:

a second wiping sub-mechanism, wherein one side corresponds to the first wiping sub-mechanism;

a third wiping sub-mechanism, corresponding to the other side of the second wiping sub-mechanism;

the sensor set, further comprising a second station sensor and a third station sensor, wherein the second station sensor and the third station sensor correspond to the second wiping sub-mechanism and the third wiping sub-mechanism respectively, the second station sensor is configured to generate a second station signal, and the third station sensor is configured to generate a third station signal; and the conveying mechanism, configured to generate a second conveying movement and a third conveying movement, wherein the second conveying movement responds to the second station signal, and the third conveying movement responds to the third station signal, wherein the second wiping sub-mechanism generates a third wiping motion according to the second station signal and a third wiping parameter, the third wiping sub-mechanism generates a fourth wiping motion according to the third station signal and a fourth wiping parameter, and the control apparatus obtains the third wiping parameter and the fourth wiping parameter according to the identification code.

10. The wiping apparatus according to claim 9, wherein the second station sensor further comprises a second start sensor and a second end sensor, wherein the second start sensor and the second end sensor are located on two sides of the second wiping sub-mechanism respectively, the second station signal comprises a second start signal and a second end signal, the second start sensor is configured to generate the second start signal, and the second end sensor is configured to generate the second end signal;

the third station sensor further comprises a third start sensor and a third end sensor, wherein the third start sensor and the third end sensor are located on two sides of the third wiping sub-mechanism respectively, the third station signal comprises a third start signal and a third end signal, the third start sensor is configured to generate the third start signal, and the third end sensor is configured to generate the third end signal;

the second conveying movement responds to the second start signal and the second end signal;

the third conveying movement responds to the third start signal and the third end signal;

the third wiping motion responds to the second start signal and the second end signal; and the fourth wiping motion responds to the third start signal and the third end signal.

11. The wiping apparatus according to claim 10, wherein the conveying mechanism further comprises:

a second conveying sub-mechanism, corresponding to the second wiping sub-mechanism, wherein the second conveying sub-mechanism is configured to generate the second conveying movement; and a third conveying sub-mechanism, corresponding to the third wiping sub-mechanism, wherein the third conveying sub-mechanism is configured to generate the third conveying movement.

12. The wiping apparatus according to claim 11, wherein the first wiping parameter comprises a first wiping range, the first wiping sub-mechanism performs the first wiping motion within the first wiping range, the second wiping parameter comprises a second wiping range, the first wiping sub-mechanism performs the second wiping motion within the second wiping range, the third wiping parameter comprises a third wiping range, the second wiping sub-mechanism performs the third wiping motion within the third wiping range, the fourth wiping parameter comprises a fourth wiping range, and the third wiping sub-mechanism performs the fourth wiping motion within the fourth wiping range.

13. The wiping apparatus according to claim 12, wherein the third wiping parameter further comprises a third wiping speed and a third wiping path, the second wiping sub-mechanism performs the third wiping motion within the third wiping range according to the third wiping speed and the third wiping path, the fourth wiping parameter further comprises a fourth wiping speed and a fourth wiping path, and the third wiping sub-mechanism performs the fourth wiping motion within the fourth wiping range according to the fourth wiping speed and the fourth wiping path.

14. The wiping apparatus according to claim 13, wherein the second wiping sub-mechanism comprises a first reciprocating movement set, the first reciprocating movement set performs a reciprocating movement within the third wiping range, the third wiping sub-mechanism comprises a second reciprocating movement set, and the second reciprocating movement set performs a reciprocating movement within the fourth wiping range.

15. The wiping apparatus according to claim 14, wherein the second wiping sub-mechanism further comprises a first winding roller set, the first winding roller set starts a winding movement according to an automatic winding parameter, the third wiping sub-mechanism further comprises a second winding roller set, and the second winding roller set starts the winding movement according to the automatic winding parameter.

16. The wiping apparatus according to claim 15, wherein the first winding roller set further comprises a first feeding member and a first receiving member, the first feeding member is configured to feed a wiping cloth to the first receiving member, the second winding roller set comprises a second feeding member and a second receiving member, and the second feeding member is configured to feed a wiping cloth to the second receiving member.

17. The wiping apparatus according to claim 16, wherein
the second conveying sub-mechanism further comprises a second stop member and a lifting member, the second stop member is located on two sides of the second conveying sub-mechanism, the lifting member pushes the second conveying sub-mechanism to the second wiping sub-mechanism according to the second station signal, so that the second stop member corresponds to a periphery of the third wiping range; and
the third conveying sub-mechanism comprises a third stop member, and the third stop member is located on two sides of the third conveying sub-mechanism, and corresponds to a periphery of the fourth wiping range.

18. The wiping apparatus according to claim 17, wherein
the conveying mechanism further comprises a fourth conveying sub-mechanism, and the fourth conveying sub-mechanism is connected to the first conveying sub-mechanism;
the sensor set further comprises a fourth station sensor, and the fourth station sensor is configured to generate a fourth station signal;
the fourth conveying sub-mechanism is configured to generate a fourth conveying movement;
the fourth conveying movement responds to the fourth station signal, and the fourth conveying movement comprises a plane rotation movement and a lifting movement; and
the fourth conveying sub-mechanism comprises a rotation stage, and the rotation stage is configured to generate the fourth conveying movement.

19. The wiping apparatus according to claim 18, further comprising:
a push rod member, located between the first conveying sub-mechanism and the second conveying sub-mechanism, wherein
the conveying mechanism further comprises a fifth conveying sub-mechanism, corresponding to a position between the first conveying sub-mechanism and the second conveying sub-mechanism, and comprising a translation stage, and the translation stage corresponds to the push rod member;
the sensor set further comprises a fifth station sensor, the fifth station sensor corresponds to the fifth conveying sub-mechanism, and the fifth station sensor is configured to generate a fifth station signal;
the fifth conveying sub-mechanism is configured to generate a fifth conveying movement, and the fifth conveying movement responds to the fifth station signal; and
the fifth conveying movement comprises a first position and a second position, the first position corresponds to the first conveying sub-mechanism, the second position corresponds to the second conveying sub-mechanism, and the translation stage is pushed by the push rod member at the second position.

* * * * *